United States Patent Office 3,282,839
Patented Nov. 1, 1966

3,282,839
MINERAL LUBRICATING OIL COMPOSITIONS
Duk Hi Lee, Berkeley, Calif., assignor to Shell Oil Company, New York, N.Y., a corporation of Delaware
No Drawing. Filed Apr. 23, 1964, Ser. No. 362,184
6 Claims. (Cl. 252—49.9)

This invention relates to new and improved mineral lubricating oil compositions and more particularly to oxidatively stabilized compounded mineral lubricating oil compositions.

It is known that certain phenolic materials such as alkylated phenols, function as oxidation inhibitors in lubricating oils. These materials are effective antioxidants at moderate temperatures for limited periods of time, but in mineral oils subjected to elevated temperatures they deteriorate and become rapidly ineffective. In order to maintain and enhance their antioxidant properties such phenols have been used in combination with a variety of other types of inhibitors such as aromatic amine, e.g., phenyl-alpha-naphthylamine, or dialkyl sulfides, phosphono compounds, e.g., zinc dialkyl dithiophosphate and thiocarbamates and the like, but with essentially little success, particularly when the base lubricant is a compounded one, namely one containing detergents, anti-wear agents and the like.

It has now been found that neat or compounded mineral lubricating oils can be stabilized over a wide temperature range and particularly at elevated temperatures and rendered essentially sludge and corrosion resistant by incorporating therein minor amounts each (0.01%—2%, preferably 0.1%–0.5% mole) of (I) an aromatic hydrazo compound having the formula

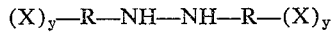

where R is a mono- or polyaromatic group, e.g., benzene or naphthalene group, X is a substituent radical attached directly to the aromatic R ring and may be a $C_{1-18}$ alkyl, cycloalkyl, alkoxy, halo (Cl, Br, F), amino radicals, etc., and y is an integer of from zero to 4; and (II) an alkylated bisphenol represented by the formula

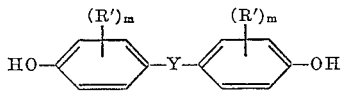

where Y stands for —S—, —S—S—, Se, —S—CH$_2$—, —CH$_2$—S—CH$_2$—, —CH$_2$—, —CHR—, —CR$_2$—, —(CH$_2$)$_n$—, —NH—, —NH—CH$_2$—, —O—, preferably —CH$_2$— or —S—; R stands for methyl or ethyl, R' a tertiary alkyl radical, and n is an integer from 1 to 3, and m is 1 to 4, preferably 1 to 2. The most preferred alkylated bisphenols are those having a sulfur bridge or, especially preferred, a methylene bridge, and where R' is a tertiary butyl radical.

The aromatic hydrazo compounds represented by generally Formula I and more specifically by formula

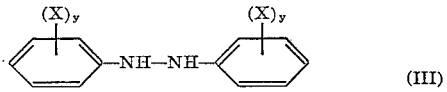

where X and y are as defined in (I) can be made by any suitable means such as described in U.S. Patents 2,383,134 and 2,688,040 and include such compounds as hydrazobenzene, 2-ethoxyhydrazobenzene, 2,2'-dimethylhydrazobenzene, 3,3'-dibutylhydrazobenzene, o- or m-hydrazotoluene, 2,2'-dichlorohydrazobenzene, 2,2'-diaminohydrazobenzene, hydrazonaphthalene, and the like.

The alkylated bisphenols represented by Formula II may contain from 1 to 8 alkyl groups, but preferably they contain from 2 to 6 alkyl groups. Alkylated bisphenols having 4 alkyl groups in the ortho positions to the hydroxy group are particularly preferred. Each of the alkyl groups may contain from 1 to 10 carbon atoms. Furthermore, the alkyl groups contained by any particular bisphenol may be the same or different and may also be primary, secondary, or tertiary alkyl groups. Bisphenols containing at least one tertiary alkyl group and preferably four tertiary butyl groups are particularly preferred.

The alkylated bisphenol may be prepared by any of the methods known in the art of bisphenol manufacture, for example, by selecting the appropriate alkylated phenols as starting materials and condensing them together by any of the established methods. For example, alkylated bisphenols may be prepared by the method described in U.S. Patent 2,944,086.

As examples of the alkylated bisphenols which may be used according to the invention there are mentioned bis(3-ethyl-4-hydroxyphenyl)disulfide, bis(3 - methyl - 4-propyl - 5 - hydroxyphenyl)disulfide, bis(2 - isopropyl - 3-butyl-5-hydroxyphenyl)selenide, 2,2'-diethyl - 3 - tertiary-butyl - 4,4' - dihydroxydiphenyl selenide, bis 1,2(2,6 - di-tertiary-butyl - 4 - hydroxyphenyl)thiaethane, bis 1,2(2,5-diisopropyl - 3 - hydroxyphenyl)thiaethane, bis(3,5 - di-tertiarybutyl-4-hydroxyphenyl)sulfide, 2,4 - di-isobutyl-3-hydroxybenzyl-2',4'-dipropyl-3-hydroxybenzyl sulfide, bis 1,2(3-octyl-5-tertiarybutyl-4 - hydroxyphenyl)ethane, bis 1,1(2,6-di-isopropyl-4-hydroxyphenyl)ethane, 1,2-bis(2,4-di-tertiarypentyl-3-hydroxyphenyl)propane, bis 2,2(4,5-di-tertiarybutyl-2-hydroxyphenyl)-propane, bis(2 - tertiary-butyl-5-isopentyl-4-hydroxyphenyl)amine, bis(3,5-dibutyl-4-hydroxyphenyl)ether, bis(2,6 - dipropyl - 4 - hydroxyphenyl)ether.

Preferred compounds are the alkylated bisphenols having a sulfur or methylene bridge. The former include bis(2,5-dipentyl-4-hydroxyphenyl)sulfide, bis(2,5-dihexyl-3-hydroxyphenyl)sulfide, bis(2-methyl-5-tertiarybutyl - 4-hydroxyphenyl)sulfide, bis(2 - methyl - 5 - tertiarybutyl-6-hydroxyphenyl)sulfide and particularly bis(3 - tertiarybutyl-5-methyl - 2 - hydroxyphenyl)sulfide. Examples of the latter, namely alkylated bisphenols having a methylene bridge, include bis(2,3-di-tertiarybutyl-4-hydroxyphenyl)-methane, bis(2,6 - di-tertiarybutyl-4-hydroxyphenyl)methane, (bis(2,6 - di-tertiarybutyl-4-hydroxyphenyl)methane, bis(3,5 - di-tertiaryoctyl-4-hydroxyphenyl)methane, bis(3-tertiarybutyl-5-tertiaryoctyl - 4 - hydroxyphenyl)methane, and especially bis(3,5-di-tertiarybutyl-4-hydroxyphenyl)-methane.

The particularly preferred additive mixtures on a mole percent basis which are illustrative of the present invention include:

(Ia) Hydrazobenzene (0.15%) and bis(3,5 - di-tertiarybutyl-4-hydroxyphenyl)methane (0.15%)
(IIa) 2,2'-dimethylhydrazobenzene (0.15%) and bis(3,5-di-tertiarybutyl-4-hydroxyphenyl)methane (0.15%)
(IIIa) 2,2'-dichlorohydrazobenzene (0.15%) and bis(3,5-di-tertiarybutyl-4-hydroxyphenyl)methane (0.1%)
(IVa) Hydrazobenzene (0.15%) and bis(3,5-di-tertiarybutyl-4-hydroxyphenyl)sulfide (0.15%)
(Va) Hydrazobenzene (0.1%) and bis(3,5-di-tertiarybutyl-4-hydroxyphenyl)methane (0.1%)
(VIa) Hydrazonaphthalene (0.15%) and bis(3,5 - di-tertiarybutyl-4-hydroxyphenyl)methane (0.1%)
(VIIa) Hydrazonaphthalene (0.15%) and (2,6-diisopropyl-4-hydroxyphenyl)methane (0.15%)

The mineral lubricating oil base may be derived from a variety of petroleum base stocks and are preferably paraffinic and/or naphthenic in character; they may also contain substantial proportions of hydrocarbons having aromatic character. The viscosity may vary within wide limits so that the oils may belong, for example, to SAE classes 5W, 10W, 20W, 20, 30, 40, 50, 60, or 70. Suitable oils may be derived from highly paraffinic crudes in which case distillation and/or dewaxing may be sufficient to provide a suitable base stock; chemical or selective solvent treatment may be used if desired, but is preferably kept to a minimum for economic reasons. Mixed-base crudes and even highly aromatic crudes which contain paraffinic hydrocarbons also provide suitable oil base stocks after refining by well-known techniques such as the separation of distillate fractions of suitable boiling range followed by solvent extraction with selective solvents, for example, furfural or phenol, to provide raffinate fractions, dewaxing, and chemical treatment, for example, sulfuric acid treatment.

Mineral lubricating oil bases and such bases containing oxygen- or nitrogen-containing polymeric detergents are particularly susceptible to improvement and stabilization by the additive mixture of the present invention. The nitrogen-containing polymeric detergents are copolymers of monomers having polymerized linkages and containing nitrogen-containing groups which may be amino or amido groups. They may be derived from polymerizable monomers containing primary, secondary or tertiary (the latter two are preferred) amino nitrogen, including heterocyclic amino or amido nitrogen-containing substances, having an ethylenically unsaturated polymerizable group. These detergent polymers may be obtained by polymerizing vinyl substituted heterocyclic nitrogen-containing substances such as vinyl pyridine, vinyl picoline and vinyl quinoline, vinyl pyrrolidone or vinyl arylamines, such as paraaminostyrene, or polyamines prepared by reacting polymeric epoxy compounds with ammonia or primary or secondary amines, with polymerizable unsaturated alcohols, acids or ester, such as acrylates and methacrylates of long chain fatty acids, and the like. The preferred polymeric amino or amido compounds are those containing tertiary amine groups and particularly those containing heterocyclic amino groups such as obtained by copolymerizing a polymerizing heterocyclic nitrogen base compound with a polymerizable unsaturated material free of heterocyclic nitrogen-containing radicals such as are described in British patent specification 760,544 and U.S. Patents 2,839,512 and 2,889,282. The copolymers include: (A) copolymer of stearyl methacrylate, and 2-methyl-5-vinyl pyridine; (B) copolymer of stearyl methacrylate, lauryl methacrylate and 2-methyl-5-vinyl pyridine; and those which contain additional $C_{1-4}$ alkyl methacrylates in the polymer, such as (C) copolymers of stearyl methacrylate, lauryl methacrylate, methyl methacrylate, and 2-methyl-5-vinyl pyridine; and similar copolymers in which the methyl methacrylate is replaced by butyl methacrylate and the 2-methyl-5-vinyl pyridine is replaced by 5-ethyl-2-vinyl pyridine; or (D) copolymer of lauryl methacrylate and N-vinyl pyrrolidone or similar copolymers as described in the British Patent 808,664 and mixtures thereof. Acrylate N-vinyl pyrrolidone copolymers, e.g., N-vinyl pyrrolidone and lauryl methacrylate can be of varying molecular weights. Other suitable polymeric amines are (E) copolymers of lauryl methacrylate and diethylaminoethylmethacrylate (note U.S. Patent 2,737,496).

Particularly preferred detergent polymers are Acryloid 917 and 966 (copolymers of N-vinyl pyrrolidone and lauryl methacrylate in the molecular weight range of 400,000 to 500,000) or the copolymers of vinyl pyridine and mixtures of dissimilar methacrylate esters, such as copolymers (B) or (C) prepared by the methods described in U.S. patents mentioned above.

The oxygen-containing detergents include copolymers of $C_{8-18}$ alkyl acrylates and ω-hydroxy alkyl methacrylate, e.g., (F) copolymer of stearyl methacrylate, lauryl methacrylate and 2-hydroxyethyl methacrylate. Other examples of suitable copolymers are those described in U.S. Patents 2,800,453, and 3,033,828.

When desired, additional improvements with respect to stability, wear and scuffing inhibition can be imparted to the oil compositions containing the polymer of this invention by incorporating small amounts (0.01%–2%, preferably 0.1%–1%) of amine antioxidants such as arylamines such as phenyl-alpha-naphthylamine. Antiscuffing agents include organic phosphites, phosphates, phosphonates and their thio-derivatives, such as di- or tri-($C_{3-18}$ alkyl phosphites), or phosphates, e.g., di- or tributyl, octyl, lauryl, stearyl, cyclohexyl, benzyl, cresyl, phenyl phosphites or phosphates, as well as their thio-derivatives, $P_2S_5$-terpene reaction products, e.g., $P_2S_5$-pine oil reaction products, e.g., $P_2S_5$-pine oil reaction products and alkali metal salts thereof such as potassium salt of a $P_2S_5$-terpene reaction product, phosphates such as dibutyl trichloromethanephosphonate, dibutyl monochloromethanephosphonate, and the like. The diphenyl, dicresyl, triphenyl, tricresyl and tristearyl ortho-phosphates or potassium salt of $P_2S_5$-terpent reaction product are preferred.

Illustrative compositions of the present invention are as follows:

Composition (a): Percent
  Mixture (Ia) _____ 0.3% mole.
  Mineral lubricating oil _____ Balance.

Composition (b):
  Mixture (Ia) _____ 0.3% mole.
  Copolymer (C) stearylmethacrylate/ lauryl methacrylate/2 - methyl - 5-vinyl pyridine (MW=800,000) ____ 1.5% wt.
  Mineral lubricating oil _____ Balance.

Composition (c):
  Mixture (Ia) _____ 0.3% mole.
  Copolymer (C) _____ 1.5% wt.
  Dicresyl phosphate _____ 0.04% wt.
  Tricresyl phosphate _____ 0.8% wt.
  Mineral lubricating oil _____ Balance.

Composition (d):
  Mixture (Ia) _____ 0.3% mole.
  Copolymer (D) lauryl methacrylate and N-vinyl pyrrolidone (MW=450,000) . 5% wt.
  Mineral lubricating oil _____ Balance.

Composition (e):
  Mixture (IIa) _____ 0.3% mole.
  Copolymer (C) _____ 5% wt.
  Dicresyl phosphate _____ 0.04% wt.
  Tricresyl phosphate _____ 0.8% wt.
  Mineral lubricating oil _____ Balance.

Composition (f):
  Mixture (Ia) _____ 0.3% mole.
  Copolymer (F) _____ 1.5% wt.
  Dicresyl phosphate _____ 0.04% wt.
  Tricresyl phosphate _____ 0.8% wt.
  Mineral lubricating oil _____ Balance.

In the LS–3 Cadillac Engine Test operated under the following conditions: 400 repeating cycles of 15 minutes each, comprising 1 minute at 90° F. jacket temperature, 10 minutes at 135° F. jacket temperature and 2500 r.p.m. and 4 minutes at 190° F. jacket temperature at 3200 r.p.m., using high sulfur (1%) fuel, the results were as follows: Composition (c) ran for over 145 hours at which time the engine was clean, free of sludge and corrosion and otherwise in excellent condition. When in the same type compositions the hydrazobenzene was removed and the resulting composition used in the LS–3 test visible sludge formation was noted at end of 40 hours and engine had to be stopped at end of 60 hours because of excessive sludge deposits. Essentially the same results are obtainable using Compositions (b), (d), (e), or (f) of the present invention as were obtained with composition (c). On the other hand when in Composition (c) mixture Ia is replaced by 1% of bis(3,5-di-tertiarybutyl-4-hydroxyphenyl)methane or by an equivalent amount of hydrazobenzene and the resulting compositions engine tested (LS–3 condition), operation of the engine had to be terminated at the end of 20 hours because of heavy sludge formation.

We claim as our invention:

1. A mineral lubricating oil composition comprising a major amount of mineral lubricating oil and from about 0.01% to about 2% each of (1) an aromatic hydrazo-compound selected from hydrazonaphthalene and a compound of the formula

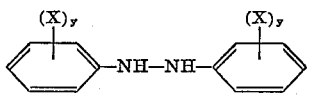

where X is a radical selected from alkyl, alkoxy, halogen and hydrogen, and (2) bis(3,5-di-tertiarybutyl-4-hydroxyphenyl)methane.

2. A mineral lubricating oil composition comprising a major amount of mineral lubricating oil and from about 0.01% to about 2% moles each of hydrazobenzene and bis(3,5-di-tertiarybutyl-4-hydroxyphenyl)methane.

3. The composition of claim 1 containing a minor amount of a copolymer of vinyl pyridine and a mixture of alkyl methacrylates.

4. The composition of claim 1 containing minor amounts of a copolymer of vinyl pyridine and a mixture of alkyl methacrylates and aryl phosphates.

5. The compositions of claim 1 containing minor amounts of each of (1) copolymer of 2-methyl-5-vinyl pyridine and a mixture of stearyl and lauryl methacrylates (2) dicresyl phosphate and (3) tricresyl phosphate.

6. The composition of claim 1 containing a minor amount of a copolymer of N-vinyl pyrrolidone and lauryl methacrylate.

References Cited by the Examiner

UNITED STATES PATENTS

| | | | |
|---|---|---|---|
| 2,027,394 | 1/1936 | McMullan | 44—64 |
| 2,203,102 | 6/1940 | Powers | 252—49.8 |
| 2,729,690 | 1/1956 | Oldenburg | 252—50 |
| 2,839,512 | 6/1958 | Barnum et al. | 252—51.5 |
| 2,944,086 | 7/1960 | Coffield et al. | 252—52 |
| 3,114,713 | 12/1963 | Coffield | 252—48.2 |

FOREIGN PATENTS

| | | |
|---|---|---|
| 590,943 | 1/1960 | Canada. |
| 808,665 | 2/1959 | Great Britain. |

DANIEL E. WYMAN, *Primary Examiner.*

L. G. XIARHOS, *Assistant Examiner.*